United States Patent

Tonogai et al.

[11] Patent Number: 5,323,118
[45] Date of Patent: Jun. 21, 1994

[54] HINGED DISPLACEMENT SENSOR

[75] Inventors: Yoshihide Tonogai; Masaaki Takagi, both of Tokyo, Japan

[73] Assignee: Copal Company, Limited, Tokyo

[21] Appl. No.: 974,160

[22] Filed: Nov. 10, 1992

[30] Foreign Application Priority Data

Nov. 12, 1991 [JP] Japan .................................. 3-296059
Dec. 27, 1991 [JP] Japan .................................. 3-347497

[51] Int. Cl.$^5$ ............................................. G01R 27/26
[52] U.S. Cl. ................................... 324/661; 324/660; 361/280; 361/283.2
[58] Field of Search ............... 324/658, 660, 661, 662; 361/280

[56] References Cited

U.S. PATENT DOCUMENTS

| | | | |
|---|---|---|---|
| 2,968,952 | 1/1961 | Stalder | 324/661 X |
| 4,310,806 | 1/1982 | Ogasawara | 324/661 X |
| 4,439,725 | 3/1984 | Ogasawara | 324/662 |
| 5,028,875 | 7/1991 | Peters | 324/660 |
| 5,136,286 | 8/1992 | Veneruso | 324/660 X |

Primary Examiner—Walter E. Snow
Assistant Examiner—Glenn W. Brown
Attorney, Agent, or Firm—Hickman & Beyer

[57] ABSTRACT

This invention comprises two electrode plates 1a and 1c which are arranged in parallel to each other, and a middle electrode plate 1b. One end of an electrostatic capacity member 2 serves as a fixed portion 3 while the other end thereof serves as a movable portion 4, and both end portions of each of these electrode plates 1,1 are provided with hinges so that the movable portion 4 is movable in parallel relative to the fixed portion 3. Additive capacity is further provided by the insulating plate 6 to improve the linearity of the detection output.

17 Claims, 8 Drawing Sheets

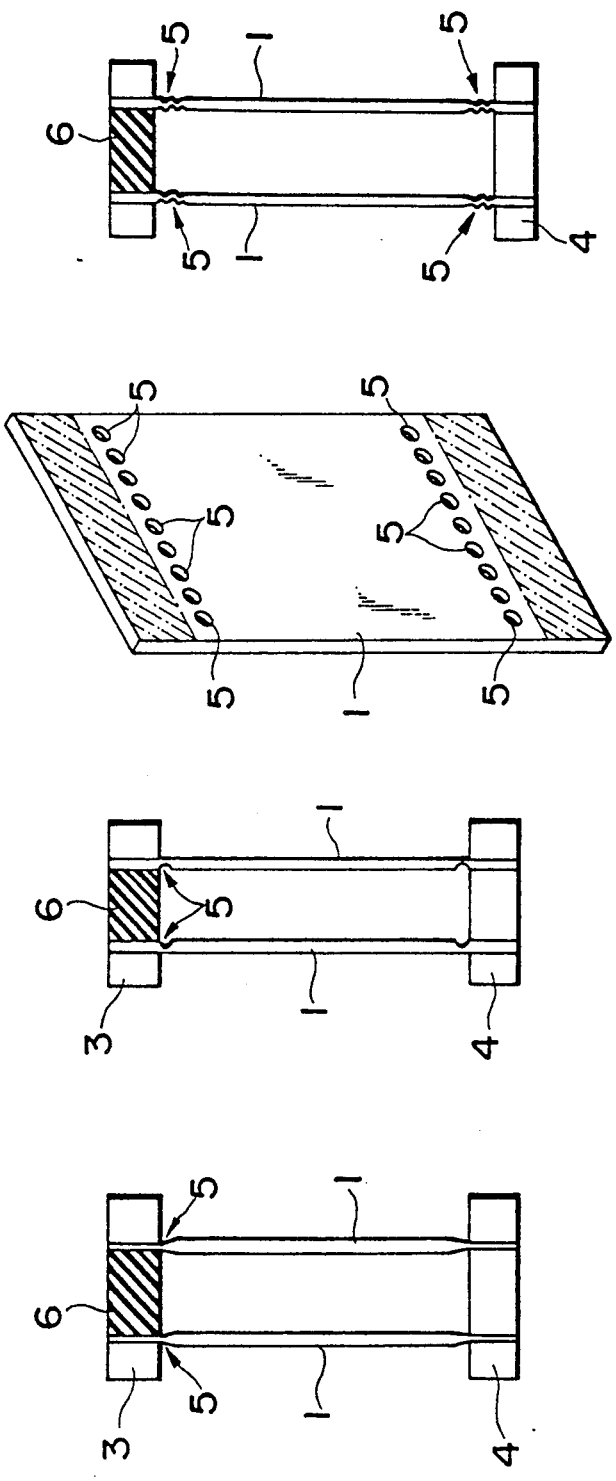

HINGED DISPLACEMENT SENSOR

BACKGROUND OF THE INVENTION

1. Field of the Invention

This invention relates to a capacitance type displacement sensor which is used to detect a displacement of an object, such as tilt angle, acceleration, position etc., for example.

2. Related Background Art

Displacement gauges of the prior art include contact-type and non-contact type devices.

The contact-type displacement gauge has a construction that a brush 61 secured to the tip of a pendulum 60 is slid in contact with a resistor 62 which is supplied with a constant voltage as shown in FIG. 1, and voltages into which the constant voltage is divided by the brush 61 are output as a detection output to detect a tilt angle.

On the other hand, as shown in FIG. 2, the non-contact type displacement gauge has a construction that a magnet 71 secured to the tip of a pendulum 60 is swung along side magnetic resistant elements 72 and 73 without contacting with the magnetic resistant elements 72, 73, and a tilt angle is differentially detected on the basis of the variation in resistant values of the magnetic resistant elements 72 and 73.

The contact-type displacement gauge as described above is a displacement gauge in which a contact portion such as a brush is displaced along a resistor while contacting the resistor to thereby output a voltage obtained by split resistance, and it has a limited life time because it is operated in a contact mode. A rotational torque is increased due to friction of the contact portion, so that an output has large hysteresis. Conversely, in order to reduce the hysteresis, a larger deadweight or a longer arm is required, so that the displacement gauge becomes more enormous and weighty. Therefore, the contact-type displacement gauge has problems in its durability and detection accuracy for displacement amount.

In the non-contact type displacement gauge, the problem as described above does not occur. However, the magnetic characteristic of the magnet is liable to be deteriorated with time lapse, so that there are problems in detection accuracy and durability. In addition, the magnetic resistant element is formed of a semiconductor and thus its temperature characteristic is degraded, so that an appropriate temperature compensation must be considered for use over a broad temperature range.

SUMMARY OF THE INVENTION

This invention has been implemented in view of the above problems, and has an object to provide a displacement gauge having high durability in which no hysteresis occurs and no deterioration of the detection accuracy for displacement amount occurs even for use over a long time and under a relatively-broad temperature range.

In order to attain the above object, this invention is characterized by including a pair of electrode members arranged so as to be confronted to each other, additive capacity means having constant capacity which is provided between the pair of electrode members and a signal source for applying an alternating voltage to one of the pair of electrode members, the displacement sensor being secured to an object being measured so that at least one of a distance between the pair of electrode members and a confront area thereof is non-linearly varied in accordance with a displacement to be measured, and a detection result for the displacement being output as an electric potential of the other of the pair of electrode members.

Here, it is preferable that one end portion of each of the pair of electrode members is linked to the object being measured through a first hinge movable in a displacement direction to be measured, material having dielectric constant higher than that of environmental material is interposed between the other ends of the pair of electrode members to form additive capacity means, and the constructive portion of the additive capacity means is linked to middle portions of the pair of electrode members.

This invention is also characterized by including first and second electrode members arranged so as to be confronted to each other, a third electrode member disposed between the first and second electrode members so as to be confronted to the first and second electrode members, additive capacity means having constant capacity which is provided between the first and third electrode members and between said second and third electrode members, and a signal source for applying an alternating voltage between the first and second electrode members, the displacement sensor being secured to an object being measured so that at least one of a distance between the first and third electrode members and between the second and third electrode members, and a confront area thereof is non-linearly varied in accordance with a displacement to be measured, and a detection result for the displacement being output as an electric potential of the third electrode member.

In this case, it is preferable that one end portion of each of the first, second and third electrode members is linked to the object being measured through a first hinge movable in a displacement direction to be measured, and the link position of the third electrode member and the first hinge is different from those of the first and second electrode members and the first hinge in the displacement direction.

It is also preferable that material having a dielectric constant higher than that of environmental material is interposed between the other end portions of the first, second and third electrode members to form additive capacity means, and the constructive portion of the additive capacity means is linked to a middle portion of each of the first, second and third electrode members through a second hinge movable in the displacement direction.

Through displacement to be measured, for example, the electrode members which are arranged in parallel are inclined while keeping their parallel state, and this inclination follows the variation of the distance between the electrode members and the confront area thereof.

As a result, the electrostatic capacity between the electrode members is varied, and thus by applying an alternating voltage to an electrode member, the displacement amount can be detected on the basis of the electric potential of the other electrode member. That is, by forming the capacitance type sensor of three electrode members and positionally deviating a hinge of the middle electrode member from hinges of the electrode members at both sides of the middle electrode member in a direction vertical to the displacement direction, through the inclination of the electrode members due to the displacement, the confront distance between the middle electrode member and the electrode member at one side of the middle electrode member and the confront distance between the middle electrode member and the electrode member at the other side of the middle electrode member are in such a relationship that one distance is decreased as the other distance is increased.

This is equivalent to a relationship that the electrostatic capacity between the middle electrode member and the electrode member at one side of the middle electrode member is increased as the electrostatic capacity between the middle electrode member and the electrode member at the other side of the middle electrode member is decreased, and vice versa. Therefore, these variations can be differentially detected by connecting the electrode members at both sides to an alternating power source and obtaining a detection output from the middle electrode member, so that an accurate detection output which has been subjected to temperature compensation can be obtained. In this case, since the variation of the electrostatic capacity is non-linear (for example, sinusoidal) with respect to the displacement to be measured, a linear output voltage can be detected by providing additive capacity.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIGS. 10A to 10D are views showing modifications of the present invention.

DESCRIPTION OF THE PREFERRED EMBODIMENT

Figure 1:
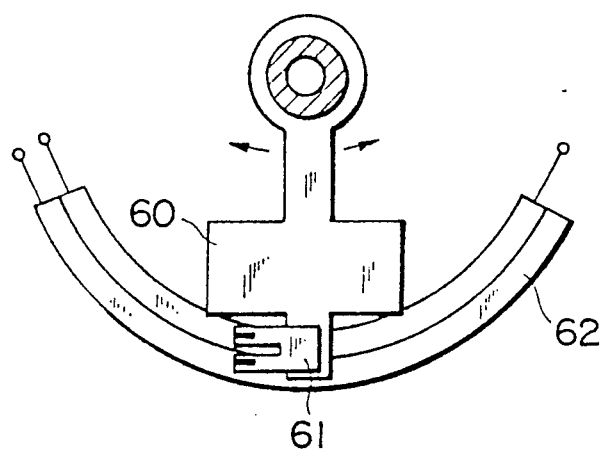
FIG. 1 is a diagram showing the construction of a conventional contact-type displacement gauge.
Figure 2:
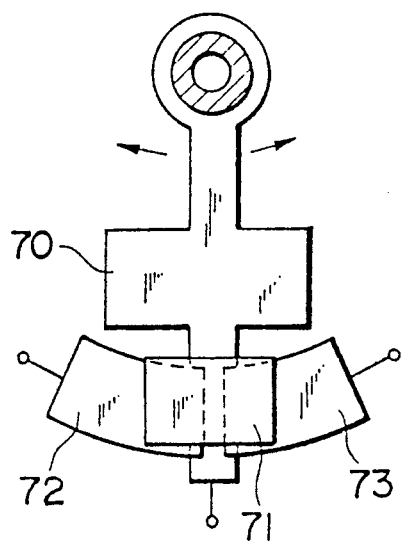
FIG. 2 is a diagram showing the construction of a conventional non-contact type displacement gauge.
Figure 3:
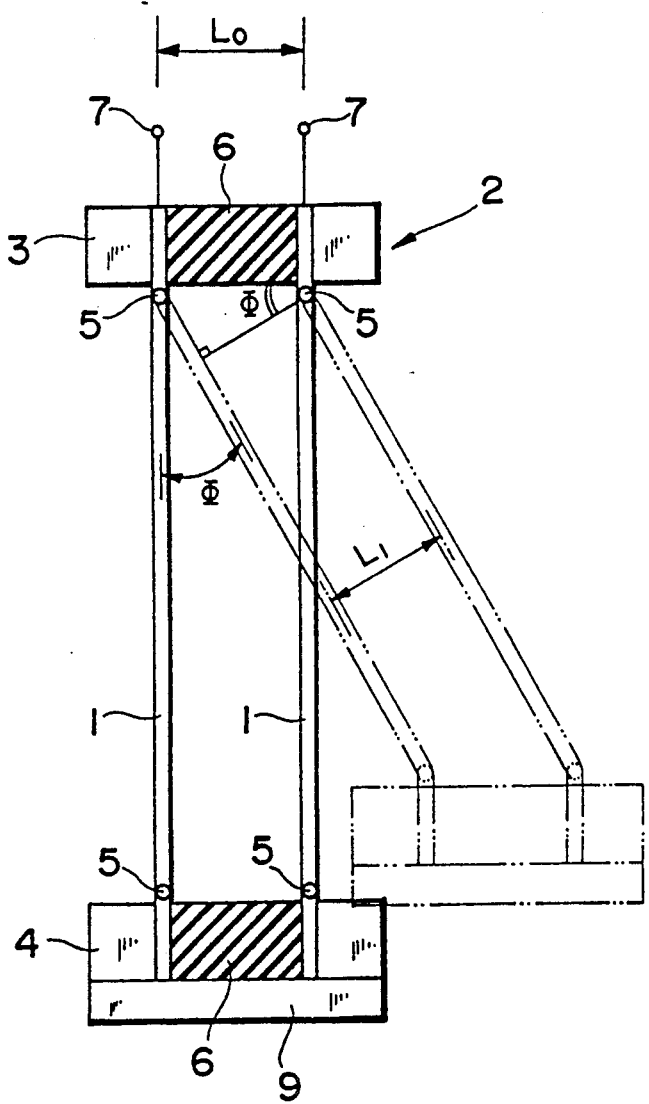
FIG. 3 is a side view of a displacement gauge of a first embodiment according to this invention.

The displacement gauge of a first embodiment according to this invention will be described with reference to FIG. 3. Two electrode plates 1,1 formed of conductive material are arranged in parallel to form an electrostatic capacity member 2. Both of confronting end portions of the respective electrode plates 1,1 are fixedly laminated with adhesive agent or the like while an insulating plate 6 is interposed therebetween. One end of the electrostatic capacity member 2 is used as a fixed portion 3 while the other end thereof is used as a movable portion 4, and hinges 5, 5 are provided to both end portions of each electrode plate 1 so that the movable portion 4 is movable in parallel to the fixed portion 3. The respective hinges 5 are provided so as to be in contact with the lower surface of the fixed portion 3 and the upper surface of the movable portion 4 respectively, and with this construction, a so-called parallel link mechanism is formed for both electrodes 1,1.

In addition, electrode terminals 7,7 which are connected to the electrode plates 1,1 are provided at the upper surface of the fixed portion 3, one serving as a power-source terminal while the other serves as an output terminal.

In the above construction, representing gap interval and effective confronting area of the electrode plates 1,1 between the hinges 5,5 of both end portions by $L_1$ and $S_1$, and representing gap interval and effective confronting area of the electrode plates at the outside of the hinges 5,5, that is, at the fixed portion 3 and the movable portion 4 of the electrostatic capacity member 2 by $L_0$ and $S_0$, the electrostatic capacity C of the electrostatic capacity member 2 is represented as follows:

$$C = \epsilon_0(S_1/L_1 + \epsilon_S \cdot S_0/L_0)$$

Here, $\epsilon_0$ represents vacuum dielectric constant, and $\epsilon_S$ represents dielectric constant of the insulating plate 6. Here, if the movable portion 4 is displaced relatively to the fixed portion 3 so that the electrode plates 1,1 are inclined by an angle $\Phi$, a gap interval $L_1$ between the electrode plates after the displacement is represented by $L_0 \cos \Phi$, and the electrostatic capacity is varied with the angle $\Phi$ in accordance with the above equation.

Therefore, if the movable portion 4 is so designed as to be displaced through a pin (not shown) or the like in accordance with the displacement of an object being measured, the displacement of the object being measured can be measured on the basis of the variation of the electrostatic capacity C. In addition, if a deadweight 9 is secured to the movable portion 4, a tilt angle of the fixed portion 3 with respect to the gravity direction could be also measured. An additive floating capacity $C_0 = \epsilon_0 \cdot \epsilon_S \cdot S_0/L_0$, which is formed by interposing the insulating plate 6 of dielectric constant $\epsilon_S$, functions to improve the non-linearity of the output voltage and provide a linear output. This function is remarkable particularly in a second embodiment as described later.

As described above, the displacement gauge according to this embodiment has an analog output, so that it will theoretically have an infinite resolution, and it has an endless lifetime because it is operated in a non-contact mode.

As described above, according to the displacement gauge of this embodiment, since the displacement is detected on the basis of the variation in electrostatic capacity which is caused by variation of the distance between the electrodes due to the inclination of the electrode plates, no hysteresis occurs and no deterioration in durability and detection accuracy due to abrasion occurs. In addition, the displacement gauge of this embodiment has no deterioration in detection accuracy with time lapse, and is usable over a broad temperature range.

Upon action of an elastic force on the hinge, the electrode plate can be inclined by an angle corresponding to a force acting on the movable portion through acceleration. Therefore, the displacement gauge of this embodiment is usable as an acceleration sensor.

A second embodiment in which this invention is applied to an inclinometer will be hereunder described with reference to FIGS. 4 and 5.

In this embodiment, three electrode plates 1a, 1b and 1c are arranged mutually in parallel to one another, and both ends of the respective electrodes 1a, 1b and 1c are fixedly laminated through insulating plates 6 using adhesive agent in the same manner as the first embodiment as described above, thereby forming an electrostatic capacity member 2 comprising substantially two condensers. The dielectric constant of insulating plates 6 is higher than the dielectric constant of a material, such as air, that separates the three electrode plates 1a, 1b, and 1c. The electrostatic capacity member 2 is so designed that the upper end thereof serves as a fixed portion 3 while the lower end thereof serves as a movable portion.

Figure 4:
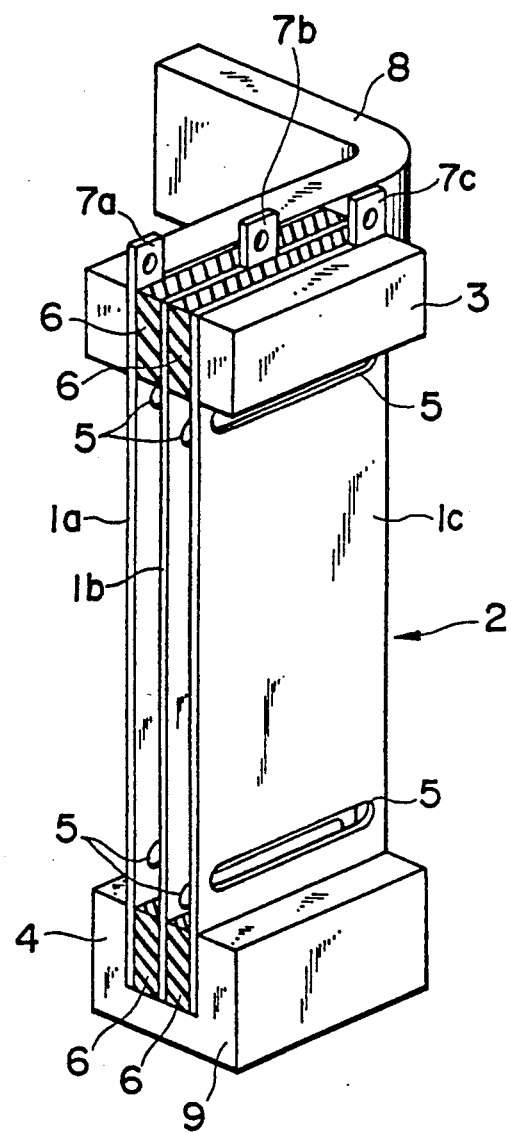
FIG. 4 is a perspective view of a displacement gauge of a second embodiment according to this invention.

In addition, as shown in FIG. 4, the fixed portion 3 is provided with a bracket 8 through which the electrostatic capacity member 2 is pendently secured to the object being measured, and a deadweight 9 is secured to the movable portion 4.

Hinges 5 are provided to both end portions of each electrode plate so that a parallel link mechanism for parallel displacing the movable portion 4 relatively to the fixed portion 3 is formed by the electrode plates 1a, 1b and 1c. In this case, the hinge 5 of the second electrode plate 1b at the middle position is located so as to be positionally deviated in a up-and-down direction from the locating positions of the hinges 5 of the first and third electrode plates 1a and 1c at the right and left sides by a predetermined amount.

Figure 5:
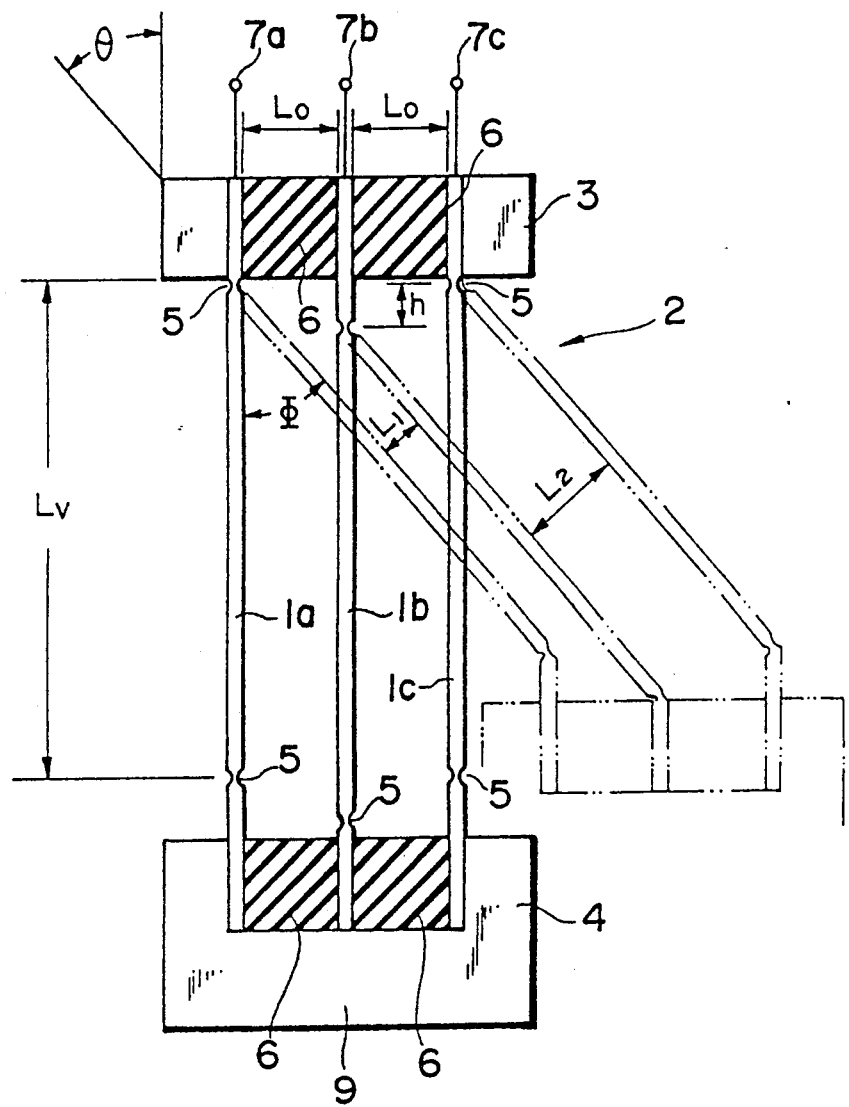
FIG. 5 is a cross-sectional view of the embodiment as shown in FIG. 4 when the hinge is modified.

With this arrangement, a distance between the electrode plates 1a and 1b and a distance between the electrode plates 1b and 1c are such that through the inclination of the electrostatic capacity member, one distance is increased as the other distance is decreased, and vice versa (see FIG. 5).

Each hinge 5 comprises a bend portion which is formed integrally with the electrode plate 1a, 1b, 1c and which is elastic and bendable. The bend portion may be formed by processing a part of the member so as to be bendable like an elongated hole as shown in FIG. 4 or a thin-thickness portion as shown in FIG. 5, or may be formed by a flexible member having Ω or other shapes in section.

Figure 6:
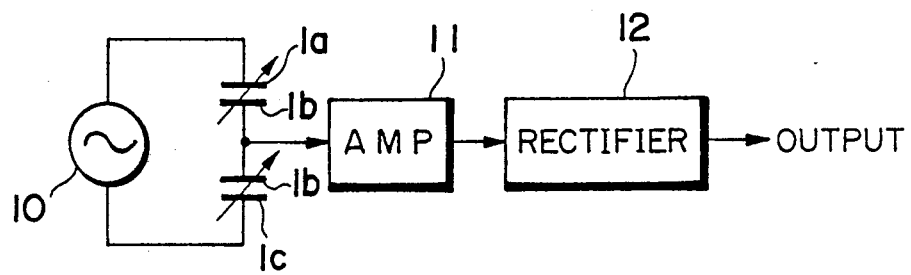
FIG. 6 is a circuit diagram of a detection circuit which is applicable to the embodiments as shown in FIGS. 4 and 5.

On the other hand, the fixed portion 3 is provided with electrode terminals 7a, 7b, 7c which are connected to the electrode plates 1a, 1b and 1c, and as shown in FIG. 6, the electrode plates 1a and 1c at the right and left sides are connected to an alternating power source 10. An alternating output from the middle electrode plate 1b is amplified by an amplifier 11, and then a detection output of direct-current level is obtained through a rectifier 12.

In the construction as described above, if an object being measured is inclined and upon action of the deadweight 9 the electrode plates 1a, 1b and 1c are inclined by an angle $\Phi$ toward the right side as indicated by an imaginary line of FIG. 5, due to the positional deviation h of the hinge 5 of the middle electrode plate 1b, the distance $L_1$ between the middle electrode plate 1b and the electrode plate 1a at the left side is represented:

$$L_1 = (L_0 - h \cdot \tan \Phi) \cos \Phi$$

and the distance $L_2$ between the middle electrode plate 1b and the electrode plate 1c at the right side is represented:

$$L_2 = (L_0 + h \cdot \tan \Phi) \cos \Phi$$

Since the positive and negative polarities of $h \cdot \tan \Phi$ are reversed between the distance $L_1$ between the middle electrode plate 1b and the electrode plate 1a at the left side and the distance $L_2$ between the middle electrode plate 1b and the electrode plate 1c at the right side, the electrostatic capacity between the electrode plates 1b and 1a and the electrostatic capacity between the electrode plates 1b and 1c are differentially varied.

Therefore, affections due to variation in temperature and variation in dielectric constant are offset, and the accurate detection output in accordance with the tilt angle can be obtained.

When the hinge 5 is constructed by the elastic and bendable bend portion as described above, the tilt angle $\theta$ of the object being measured is not coincident with the inclination angle $\Phi$ of the electrode plates 1a, 1b and 1c due to an elastic force acting on the hinge 5, however, the following equation is satisfied between $\Phi$ and $\theta$ where the spring constant of the hinge 5, the distance between the hinges at both end portions and the weight of the dead weight 9 are represented by K, $L_V$ and M, and $\theta$ can be calculated from the detection output in accordance with $\Phi$.

$$\Phi = \sin^{-1}(M/K \cdot L_V \sin \Phi)$$

Figure 7:
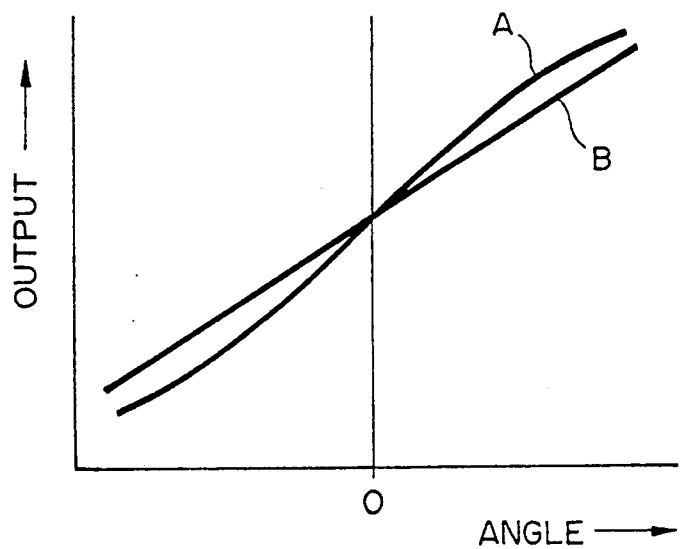
FIG. 7 is a diagram of variation characteristic of a detection output.

FIG. 7 shows the variation characteristic of the detection output with the inclination angle $\Phi$ of the three electrode plates 1a, 1b and 1c. When insulating electrostatic capacity (floating capacity) obtained at the outside portions of the hinges 5, that is, the insulating plates 6 of the fixed portion 3 and the movable portion 4 is not added to the electrostatic capacity between the respective electrode plates, the variation characteristic becomes a non-linear variation characteristic as indicated by a line "A".

However, by adding a predetermined floating capacity to the electrostatic capacity between the respective electrode plates which are located between the hinges 5 at both end portions, the variation characteristic becomes a substantially linear variation characteristic as indicated by a line "B".

Therefore, the output has high linearity with respect to the tilt angle, and has high stability with respect to variation of temperature.

Further, the output is not a digital output, but a linear output, so that the resolution is small. In addition, since it is an absolute output, even when a power failure occurs during a measurement, there is no case where a position after restoration is unclear.

FIGS. 8A to 9B show actually-measured values of the variation characteristic. In both cases, the zero capacity excluding the additive capacity serving as the floating capacity is equal to 42.5 pF. The measurement was made as a tilt-angle sensor of ±65 degrees where the spring coefficient of the hinge is set to 0.6 for the example of FIGS. 8A and 8B, and 0.8 for the example of FIGS. 9A and 9B.

Figure 8A:
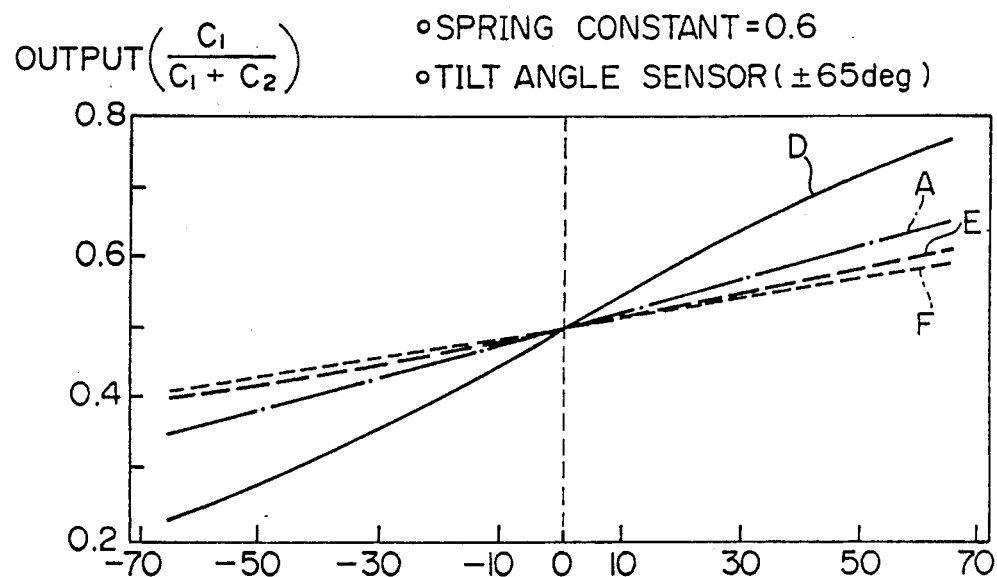
FIG. 8A is a graph of actually-measured data, showing angle dependence of detection output.
Figure 8B:
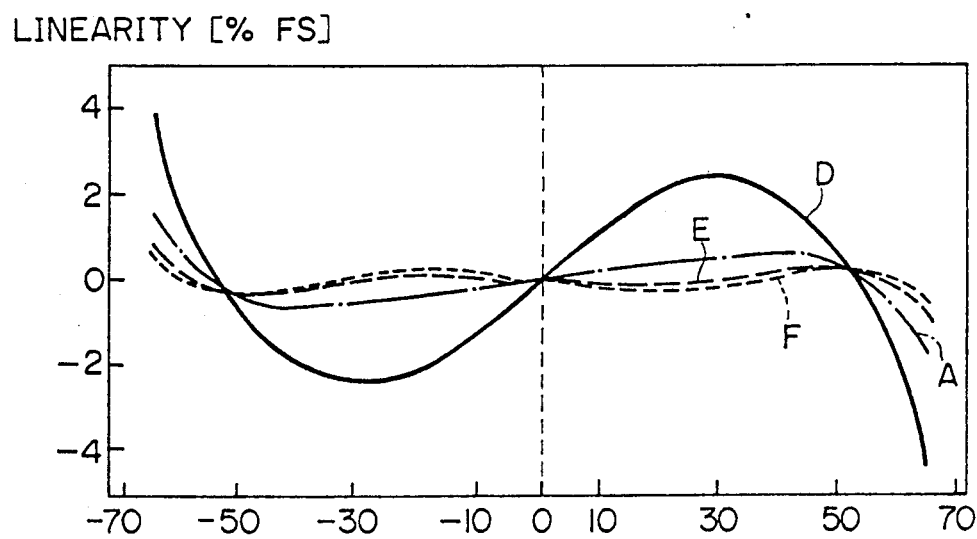
FIG. 8B is a graph of actually-measured data, showing linearity of detection output.
Figure 9A:
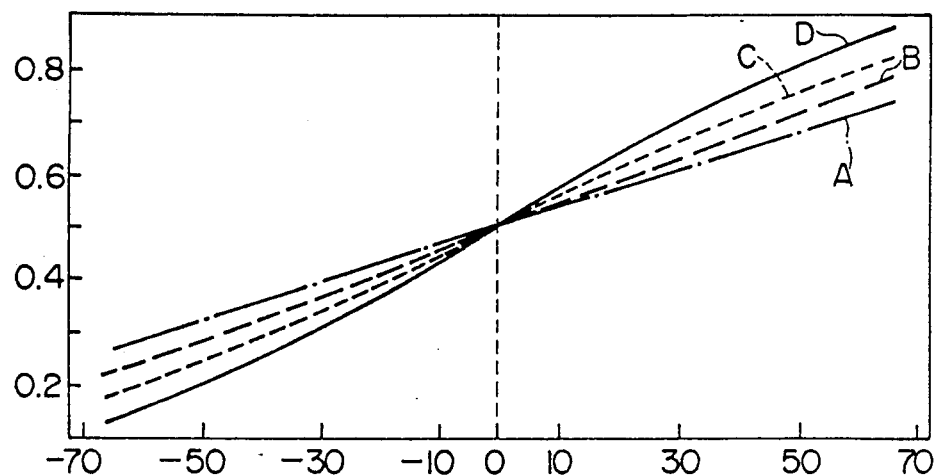
FIG. 9A is a graph of actually-measured data, showing angle dependence of detection output.
Figure 9B:
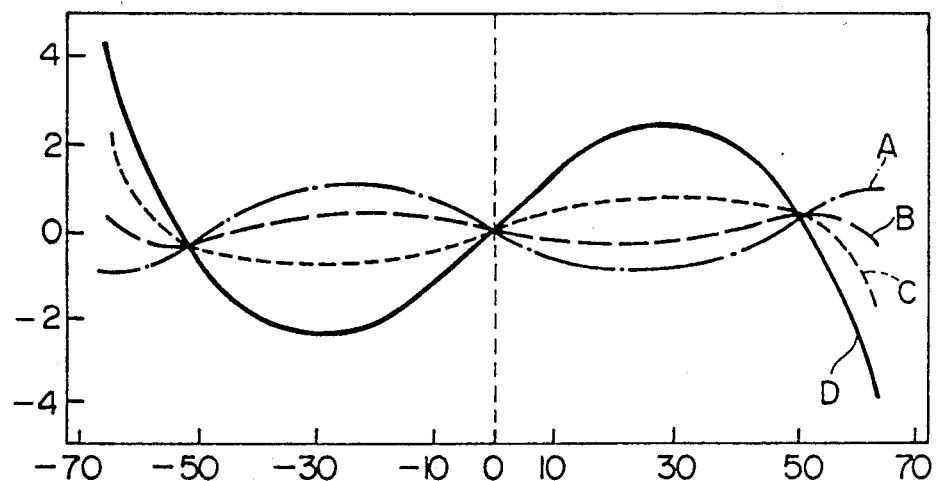
FIG. 9B is a graph of actually-measured data, showing linearity of detection output.

FIG. 8A shows angle (deg) dependence of an output; $\{C_1/(C_1+C_2)\}$, and FIG. 8B shows its linearity [%FS].

Here, the linearity [%FS] can be calculated using the following equation after a regression-line coordinate is calculated from angle-output data.

Linearity[%FS]={(actually-measured value of θ)−(coordinate value of θ calculated from regressionline)}×100/{(maximum value of output)−(minimum value of output)}

In the figures, a curved line "A" shows a case where the additive floating capacity is 50 pF, a curved line "D" shows a case where there is no additive floating capacity, and curved lines "E" and "F" show cases where the additive floating capacities are 90 pF and 110 pF, respectively. It is understandable that a non-linear variation can be approached to a linear variation by adding the floating capacity.

The same matter as described above is satisfied for the example of FIGS. 9A and 9B. A curved line "A" shows a case where the additive floating capacity is 50 pF by using a polyimide film ($\epsilon_S=3.5$), and a curved line "B" shows a case where the floating capacity is 30 pF by using a Teflon film ($\epsilon_S=2.2$). A curved line "C" shows a case where the floating capacity is assumed to be 15 pF, and a curved line "D" shows a case where there is no additive floating capacity. In this case, it is also understandable that the detection characteristic can be linear.

Since a capacity value must be generally increased to improve the detection accuracy for capacity, the area of a condenser portion must be enlarged, and a gap interval between the electrodes must be narrowed. In this embodiment, a support portion of the electrode is fixed, and thus the electrode is not rickety, so that the gap between the electrodes can be easily narrowed and the displacement gauge can be miniaturized and lightened. In addition, a differential output is obtained on the basis of differentially-varying capacities, and thus the output is stable.

Since no obstacle is disposed in the moving direction of the movable portion, the moving amount of the movable portion can be increased. Further, both ends of the electrode are so designed to be fixed, so that the gap interval between the electrodes can be decreased. As described above, the displacement gauge of this embodiment performs an amplifying mechanism for the variation in gap interval between the electrodes by positionally deviating the electrodes, so that the capacity variation is intensified for the capacity value, the accuracy is also improved and the output is also stabilized.

Upon acting the elastic force on the hinge 5, the electrode plate can be inclined by an angle corresponding to a force acting on the movable portion through acceleration, so that the displacement gauge of this invention can be used as an acceleration sensor. Further, by securing the movable portion to an object which is moved relatively to the fixed portion, this invention can be also used as a sensor for linear positional displacement.

Next, modifications of this invention will be described with reference to FIG. 10. A first modification as shown in FIG. 10A uses electrode plates each having base portions which are secured to the fixed portion 3 and the movable portion 4 and having smaller thickness. The thickness variation of the electrode plates 1 is designed such that a smooth curve is continuously varied, and the electrode plates 1 are formed of material having strong resistance to creep. A second modification as shown in FIG. 10B uses electrode plates 1 each having semispherical grooves in the neighborhood of the fixed portion 3 and the movable portion 4, so that the portions having the semispherical grooves have smaller thicknesses. A third modification as shown in FIG. 10C uses electrode plates 1 each having multiple holes which are formed in the neighborhood of the fixed portion 3 and the movable portion 4 in such a manner as to be aligned in a line along the end portion of the fixed portion 3 and movable portion 4.

Therefore, each electrode plate 1 is easily bendable around an axis corresponding to the alignment direction of the holes. A modification as shown in FIG. 10D uses electrode plates 1 each having bellows formed in the neighborhood of the fixed portion 3 and the movable portion 4. The bellows are formed so as to be returnably bendable. Therefore, the gap interval between the electrode plates in a return state is invariable.

As is apparent from the foregoing, according to this invention, through the displacement to be measured, the parallel-arranged electrode members are inclined while keeping their parallel state, and through this inclination the electrostatic capacity between the electrode members is varied.

Therefore, by applying an alternating voltage to a certain electrode member, the displacement amount can be detected on the basis of the potential of the other electrode member. Further, if the electrostatic capacity member is formed of three electrode members and the hinge of the middle electrode member is positionally deviated from the hinges of the electrode members at both sides of the middle electrode member in a direction vertical to the displacement direction, through the inclination of the electrode members due to the displacement, the electrostatic capacity between the middle electrode member and the electrode member at one side of the middle electrode member and the electrostatic capacity between the middle electrode member and the electrode member at the other side of the middle electrode member are increased and decreased respectively, and vice versa.

Therefore, by connecting both of the electrode members to the alternating power source and obtaining a detection output from the middle electrode member, these variations can be differentially detected, and an accurate detection output which has been subjected to the temperature compensation can be obtained. In this case, the variation of the electrostatic capacity is non-linear (for example, sinusoidal) with respect to the displacement to be measured, so that a linear output voltage can be detected by providing additive capacity.

The displacement can be detected on the basis of the variation of the electrostatic capacity which is caused by the variation in the distance between the electrode members and the confront area thereof, so that unlike the contact-type displacement gauge no hysteresis occurs and no deterioration in durability and detection accuracy due to abrasion occurs. In addition, since this invention uses no magnet and no semiconductor such as the magnetic resistant element unlike the conventional non-contact type of displacement gauge, this invention has effects that the detection accuracy is not deteriorated even with time lapse, and that the displacement gauge can be used over a broad temperature range.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A displacement sensor including a pair of facing pivotable electrode members arranged such that overlapping opposing surfaces of said electrode members define a confronting surface area, dielectric means which is provided between said pair of electrode members, and a signal source for applying an alternating voltage signal to a first one of said pair of electrode members, said displacement sensor arranged to be secured to an object being measured so that at least one of a distance between said pair of pivotable electrode members and said confronting surface area is non-linearly varied as a function of a displacement of said object being measured, such that a potential of a second one of said pair of electrode members is indicative of the displacement of said object being measured.

2. A displacement sensor including first and second pivotable electrode members arranged so as to be facing each other, a third pivotable electrode member disposed between said first and second electrode members so as to be facing said first and second electrode members such that opposite surfaces of said third electrode member overlap opposing surfaces of said first and second electrode members to define a first and second confronting surface area, dielectric means which is provided between said first and third electrode members and between said second and third electrode members, and a signal source for applying an alternating voltage between said first and second electrode members, said displacement sensor arranged to be secured to an object being measured so that at least one of a distance between said first and third electrode members and a distance between said second and third electrode members, and said first and second confronting surface areas are non-linearly varied as a function of a displacement of said object being measured, such that an electric potential of said third electrode member is indicative of the displacement of said object being measured.

3. A displacement sensor including:
spaced apart first and second electrode members;
a third electrode member disposed between said first and second electrode members to face respective opposing surfaces of said first and second electrode members to define first and second confronting surface areas;
dielectric means, a first portion of which is provided between said first and third electrode members and a second portion of which is provided between said second and third electrode members; and
a signal source for applying an alternating voltage between said first and second electrode members, wherein said displacement sensor is arranged to be secured to an object being measured so that at least one of a distance between said first and third electrode members and a distance between said second and third electrode members and said first and second confronting surface areas is non-linearly varied as a function of a displacement of said object being measured, and a detection result of the displacement being output as an electric potential of said third electrode member, wherein one end portion of each of said electrode members is linked to the object being measured, each one end portion having an associated first hinge which is movable in a direction where the displacement to be measured is increased and decreased, wherein associated first hinge positions of said first and second electrode members are different from that of said third electrode member.

4. The displacement sensor as claimed in claim 3, wherein said associated first hinges and associated second hinges of a second end portion of each of said electrode members are formed integrally with said electrode members.

5. A displacement sensor including;
a plurality of electrode members arranged to face each other;
a movable member securing one end portion of each of said electrode members and secured to an object being measured; and
a fixed member securing a second end portion of each of said electrode members;
wherein at least one of a gap interval between middle portions of said electrode members and a confronting surface area defined by overlapping opposing surfaces of the electrode members is non-linearly varied as a function of the displacement of the object being measured.

6. The displacement sensor as claimed in claim 5, further including dielectric means which has a dielectric constant higher than the dielectric constant of a material separating the confronting surfaces of the electrode members, the dielectric means being provided between the second end portions of said electrode members.

7. The displacement sensor as claimed in claim 5, further including dielectric means which has a dielectric constant higher than the dielectric constant of a material separating the confronting surfaces of the electrode members, the dielectric means being provided between the one end portions of said electrode members which are secured to said movable member.

8. The displacement sensor as claimed in claim 5, wherein said electrode members are formed of conductive plates which are arranged in parallel and have the same characteristics, and the middle portions thereof are capacitively linked to one another to form a parallel link mechanism.

9. The displacement sensor as claimed in claim 8, further including a deadweight arranged to be secured to the movable portions of said electrode members.

10. The displacement sensor as claimed in claim 5, wherein said electrode members comprise three identical conductive plates which are arranged in parallel, and wherein an intermediate portion of a middle conductive plate of said three conductive plates is offset from intermediate portions of the other conductive plates.

11. The displacement sensor as claimed in claim 10, wherein one end portion of said conductive plate disposed at the middle position is connected to an amplifier and a rectifier while the other conductive plates are connected to an alternating power source to detect a direct current indicative of said displacement through said rectifier.

12. A displacement sensor, including;
plural electrode members arranged to face one another;
a movable member securing one end portion of each of said electrode members and arranged to be secured to an object being measured; and
a fixed member securing a second end portion of each of said electrode members;
wherein at least one of a gap interval between associated middle portions of said electrode members and a confronting surface area defined by overlapping opposing surfaces of the electrode members is non-linearly varied as a function of the displacement of the object being measured and wherein the one end portions of said electrode members and said movable member are linked, each one end portion having a first hinge which is movable in a direction where the displacement to be measured is increased and decreased, and wherein second end portions of said electrode members and said fixed member are linked to each other, each second end portion having a second hinge which is movable in a direction where the displacement to be measured is increased and decreased.

13. The displacement sensor as claimed in claim 12, wherein said first and second hinges comprise plural holes formed along the end portions of said electrode members so as to be aligned in a line.

14. The displacement sensor as claimed in claim 12, wherein said first and second hinges are formed in the form of bellows along the end portions of said electrode members.

15. The displacement sensor as claimed in claim 12, wherein said first and second hinges each have a thickness that is less than the thickness of the associated middle portions.

16. The displacement sensor as claimed in claim 12, wherein said first and second hinges comprise elongated holes formed along the end portions of said electrode members.

17. A displacement sensor including:
a pair of facing pivotable electrode members arranged such that overlapping opposing surfaces of said electrode members define a confronting surface area;
dielectric means which has a dielectric constant higher than the dielectric constant of a material separating the confronting surfaces of the electrode members, and which is provided between fixed end portions of said pair of electrode members; and
a signal source for applying an alternating voltage signal to a first one of said pair of electrode members,
wherein said displacement sensor is arranged to be secured to an object being measured so that at least one of a distance between said pair of pivotable electrode members and said confronting surface area is non-linearly varied as a function of a displacement of said object being measured, such that a potential of a second one of said pair of electrode members is indicative of the displacement of said object being measured.

* * * * *